Figure 1:
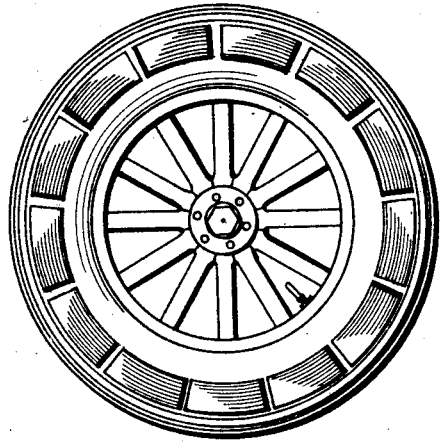

Oct. 16, 1928.

W. F. HAHN

WARNING SIGNAL FOR PNEUMATIC TIRES

Filed Aug. 15, 1927

1,687,761

INVENTOR
Waldo F. Hahn,
BY
ATTORNEY

Patented Oct. 16, 1928.

1,687,761

UNITED STATES PATENT OFFICE.

WALDO F. HAHN, OF TAMPA, FLORIDA.

WARNING SIGNAL FOR PNEUMATIC TIRES.

Application filed August 15, 1927. Serial No. 213,029.

This invention relates to pneumatic tires and more particularly to indicating means for disclosing the air pressure within the tire.

It is well known in the prior industry that ordinarily about one-third of the tire mileage is lost owing to ignorance and carelessness in the care of tires, as running on a partially deflated tire usually results in rim cuts and breaking down of the side walls of the tire.

A primary object of the invention is to provide means whereby such abuse may be prevented, a single glance at a tire equipped with such means serving to disclose its condition as regards air pressure therein so that it may be kept properly inflated and thereby greatly prolong its life.

Another object of the invention is to provide an air pressure indicator for pneumatic tires which is carried by the tire and which is operable by bending of the side wall of the tire to show whether or not the tire needs inflation.

Figure 2:
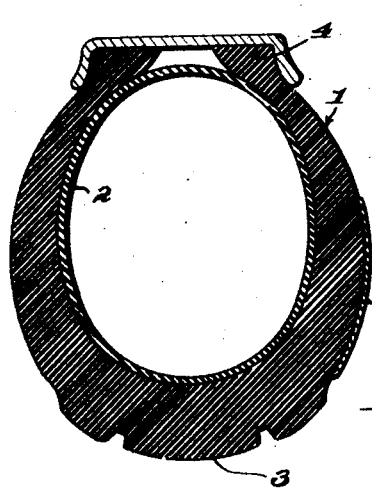
Figure 3:
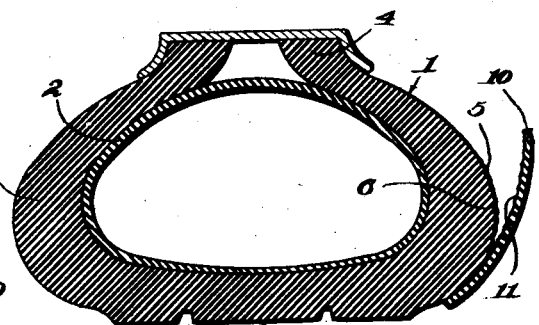
Figure 4:
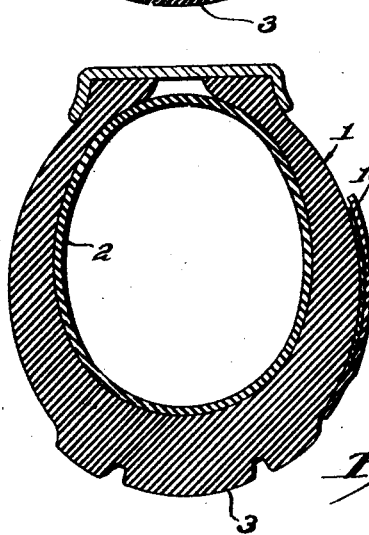
Figure 5:
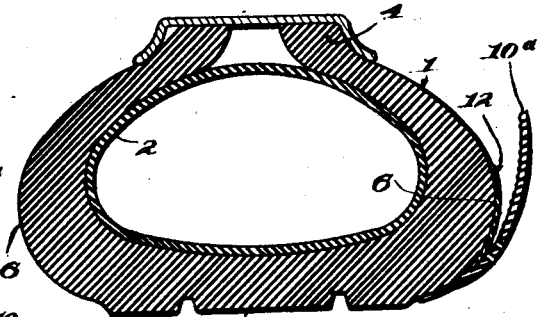

In carrying out these objects, the invention is susceptible of a wide range of modification without departing from the spirit or sacrificing any of the advantages of the claimed invention; there being shown in the drawings for illustrative purposes a preferred and practical form, in which;

Figure 1 represents a side elevation of a wheel having a pneumatic tire equipped with this improved warning signal, Fig. 2 is a transverse section thereof with the tire in its full inflated condition, Fig. 3 is a similar view with the tire partially deflated, Fig. 4 is a view similar to Fig. 2 showing a slightly different form of the invention applied, and Fig. 5 is a view similar to Fig. 3 showing the form illustrated in Fig. 4.

In the embodiment illustrated in Figs. 1 to 3, an ordinary pneumatic vehicle tire 1 is shown having the usual inner tube 2 and tread 3 with the attaching bead 4 at the rim applying portion.

The warning signal constituting this invention is shown in these figures in the form of a colored surface 5 on the outer or exposed side wall of the tire, said color extending over the portion of the side wall where the hinge-like bend occurs when the tire is deflated, as is shown clearly in Fig. 3. This color 5 is preferably of bright red so that it may be readily seen when exposed. Attached to the outer face of the tire wall at a point between the line of bend indicated at 6 and the tread portion of the tire is secured a stiff flap 10 made of any suitable material and of a width sufficient to extend up over the line of bend 6 in the tire so that when the tire is deflated and the side wall bulged, as shown in Fig. 3, this flap will be forced outwardly into the position shown in said figure and thereby disclose the colored surface 5 which is normally concealed by it. The inner face of this flap 10 is also preferably equipped with a similar color, red for instance, as shown at 11, so as to provide a maximum attention attracting means to indicate to the driver when the tire needs inflation. It is of course understood that the flap 10 may be of any suitable width and located at any proper point to cause the free edge thereof to extend over and be operated by the bend in the side wall of the tire when such is occasioned by deflation in the tire. The flap 10 may be of material so as to be extremely sensitive to any bulge occurring in the side wall of the tire, thereby adapting it to open to disclose the warning attracting color to call the attention of the driver to the fact that the tire needs inflation.

In the form shown in Figs. 4 and 5, two flaps are employed, one overlying the other, the outer flap being numbered 10ª and similar to the flap 10 of the other figures, while the inner flap 12 is attached at one edge above the line of bend 6 in the tire. The outer face of this flap 12 is colored red and cooperates with the flap 10ª to disclose the fact that the tire requires inflation.

The flaps are preferably made in sections of any desired length, and arranged continuously around the periphery of the outer face of the tire as shown in Fig. 1, the sectional formation thereof permitting them to readily open to disclose the warning color showing that the tire needs inflation.

While the forms shown herein constitute a preferred embodiment of the invention obviously any other forms may be used which are operable by the bending of the side wall of the tire to disclose a warning signal calling attention of the driver to the fact that the tire requires inflation. When these warnings are heeded and the tire immediately inflated, the life of the tire will be greatly prolonged, and a maximum mileage obtained therefrom.

The flaps are preferably provided with a plurality of openings 13 arranged adjacent their connection with the tire and which are designed for the purpose of permitting sand, water and the like, to pass out of the pockets formed between the flaps and the tire, so that the tire nor the flaps will be injured by abrasion and the like.

I claim:—

1. The combination with a pneumatic tire; of means carried by the tire and operable by the bending of the tire wall to disclose the extent of air pressure within the tire.

2. The combination with a pneumatic tire; of means on the outer face of the tire and connected to open and close on the bending or straightening of the tire wall to indicate the air pressure within the tire.

3. The combination with a pneumatic tire; the outer face of said tire being colored for a portion thereof, means normally covering said colored portion and operable by the bending of the tire wall to disclose the color beneath it when the pressure in the tire falls below a predetermined point.

4. The combination with a pneumatic tire; of an attention attracting means located on the outer face of said tire, means normally covering said attention attracting means and adapted to be opened on the bending of the side wall of the tire when the air pressure within the tire drops below a predetermined point and thereby expose said attention attracting means.

5. The combination with a pneumatic tire; of an attention attracting means carried by the outer face of one side wall thereof, a cover normally concealing said means, said cover being connected with the tire and adapted to be moved to disclose the attention attracting means when the pressure within the tire drops below a predetermined point.

WALDO F. HAHN.